United States Patent [19]

Mueller et al.

[11] Patent Number: 5,091,005
[45] Date of Patent: * Feb. 25, 1992

[54] INKS FOR BLEED-FREE INK-JET PRINTING ON PLAIN PAPER

[75] Inventors: Bruce E. Mueller, Escondido; John L. Stoffel, San Diego, both of Calif.

[73] Assignee: Hewlett-Packard Company, Palo Alto, Calif.

[*] Notice: The portion of the term of this patent subsequent to Oct. 9, 2007 has been disclaimed.

[21] Appl. No.: 551,214

[22] Filed: Jul. 10, 1990

[51] Int. Cl.⁵ .................................. C09D 11/00
[52] U.S. Cl. ........................... 106/22; 106/20; 106/23
[58] Field of Search ................. 106/20, 22, 23

[56] References Cited

U.S. PATENT DOCUMENTS

| | | | |
|---|---|---|---|
| 3,889,269 | 6/1975 | Meyer et al. | 106/22 |
| 4,153,467 | 5/1979 | Yano et al. | 106/22 |
| 4,505,749 | 3/1985 | Kanekiyo et al. | 106/20 |
| 4,604,139 | 8/1986 | Shioi et al. | 106/22 |
| 4,842,646 | 6/1989 | Gamblin | 106/22 |
| 4,961,785 | 10/1990 | Skene et al. | 106/20 |

Primary Examiner—William R. Dixon, Jr.
Assistant Examiner—Sue Hollenbeck

[57] ABSTRACT

Inks comprising, by weight, from about 4% to about 10% formamide, from about 1% to about 10% dye, and the balance water when printed on paper from an ink-jet printer have improved resistance to bleed, especially when printed at a rate up to about 3.7 kHz.

10 Claims, 1 Drawing Sheet

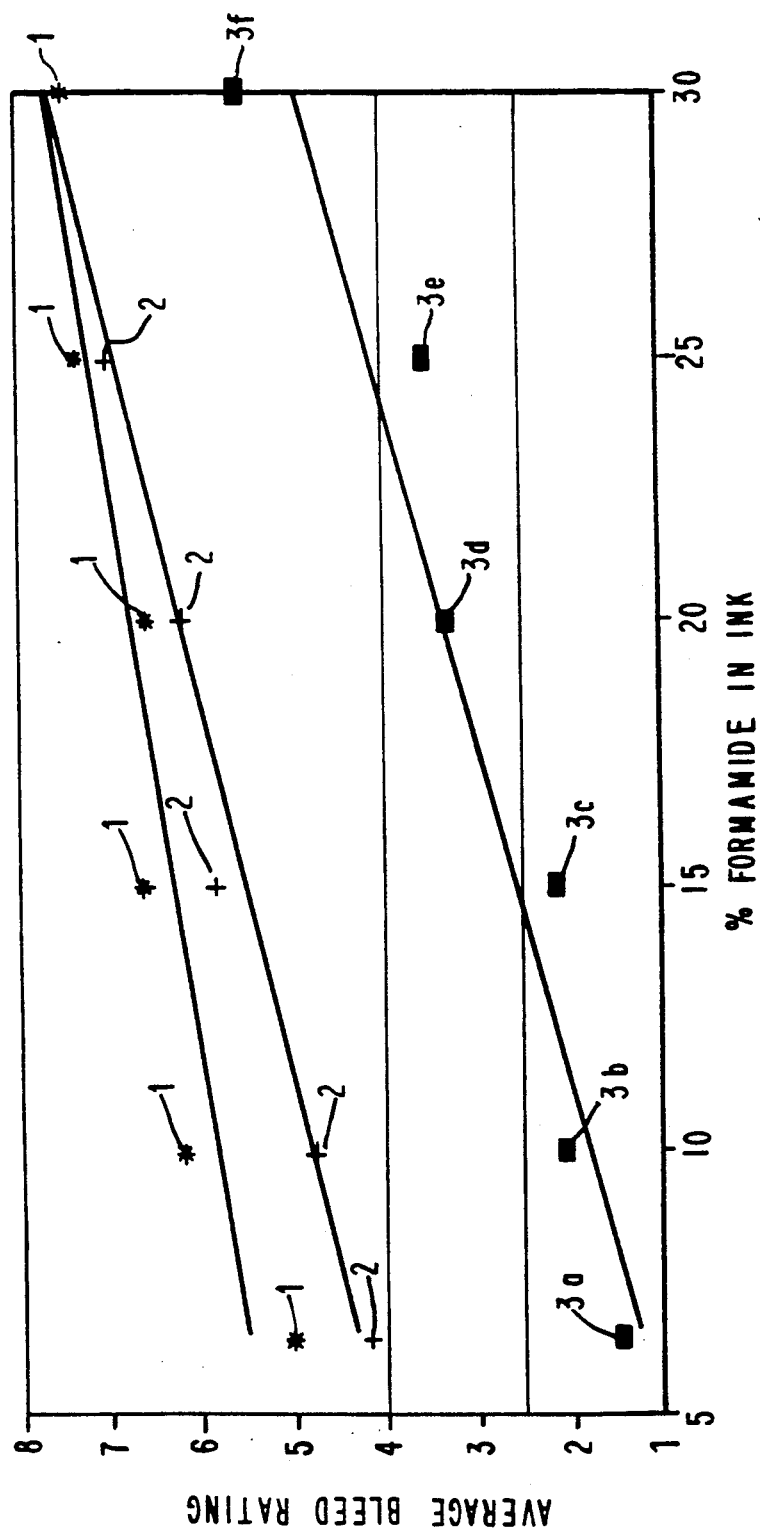

INKS FOR BLEED-FREE INK-JET PRINTING ON PLAIN PAPER

TECHNICAL FIELD

This invention relates to ink formulations for thermal ink-jet printers.

BACKGROUND ART

Thermal ink-jet printers operate by employing a plurality of resistor elements to expel droplets of ink through an associated plurality of nozzles. In particular, each resistor element, which is typically a pad of resistive material measuring about 50 μm × 50 μm, is located in a chamber filled with ink supplied from an ink reservoir. A nozzle plate, comprising a plurality of nozzles, or openings, with each nozzle associated with a resistor element, defines part of the chamber. Upon energizing a particular resistor element, a droplet of ink is expelled through the nozzle toward the print medium, whether paper, fabric, or the like. The firing of ink droplets is typically under the control of a microprocessor, the signals of which are conveyed by electrical traces to the resistor elements. By proper selection of the signals, alphanumeric and other characters are formed on the print medium.

The tight clearances of the nozzles, typically 50 μm diameter, require that the ink not clog them. Further, repeated firings of the resistor elements, which must withstand about 10 million firings over the life of the ink cartridge, can result in fouling of the resistor element. This phenomena is unique to thermal ink-jet printers and is known as kogation. The ink composition should be smear resistant and waterfast.

In copending application Ser. No. 07/309,516, (now U.S. Pat. No. 4,961,785) which has the same assignee as this application, inks for thermal ink-jet printers which contain about 15% to about 50% formamide are shown to have improved smear resistance.

Another problem encountered in this field is known as feathering. This is caused by the tendency of the ink to spread from the spot where it was placed by the printer. It is the result of the physico-chemical interactions between the wet ink and the paper.

Yet another problem is an unwanted mixing, in the case of multicolor printing, of adjacent colored areas. This is termed color bleed and is the result of the mixing of two wet inks. Both feathering and color bleed result in degraded edge definition.

Inks are known which possess one or more desirable properties. However, few ink compositions are known that possess all the desirable properties, since an improvement in one property often results in the degradation of another property. Thus, many inks used commercially represent a compromise in an attempt to achieve an ink evidencing at least an adequate response in each of the foregoing considerations.

Accordingly, investigations continue into developing ink formulations which have improved properties and which do not elevate one property at the expense of the others.

DISCLOSURE OF THE INVENTION

In accordance with the invention, the tendency of water soluble inks in formulations used in thermal ink-jet printers to bleed is significantly improved by the addition of about 4 to 10 weight % of formamide to the formulations. When used with an ink-jet printer, best results are obtained at pen frequencies up to about 4 KHz.

BRIEF DESCRIPTION OF THE DRAWING

FIG. 1 is a graphic representation of bleed ratings for inks with varying formamide concentrations and varying pen frequencies.

BEST MODES FOR CARRYING OUT THE INVENTION

The ink formulations of the present invention comprise, by weight, from about 4% to about 10% formamide, from about 1% to about 10% dye, and the balance water. Preferred formulations comprise, by weight, from about 5% to about 8% formamide, from about 1% to about 4% dye, and the balance water. They may also include a buffer and a bactericide.

The present invention can use anionic or cationic dyes of any color. Typical anionic dyes contain sulfonate or carboxylate groups. Typical cationic dyes have polymethine or arylcarbonium groups. The colorants should be water-soluble or -suspendable dyes or pigment. Formamide, at the levels used in this invention, provides these dyes with increased resistance to bleed.

Since formamide decomposes on either side of pH 6.5, a buffer may be used to keep inks that contain formamide at a pH from about 4 to about 10, preferably from about 6 to about 7. The decomposition product is chiefly ammonium formate, which is innocuous. Buffers such as ammonium acetate, ammonium formate, 2-[N-morpholino-]ethanesulfonic acid, or 3-[N-morpholino]-2-hydroxypropane sulfonic acid may be used for this purpose. Other useful buffers are well-known to practitioners of the art.

In addition, the inks may contain a bactericide. This may be any one or more of the bactericides that are commonly used with inks for thermal jet printers. The bactericide will generally constitute up to about 0.5%, preferably from about 0.1 to about 0.5% by weight, of the formulation. In the following examples, 0.3% NUOSEPT 95 ™ was used. (NUOSEPT 95 is a trademark of Nuodex.)

The inks of this invention have less tendency to bleed. In one test for this property, a thin line of one color is printed on paper. After a time delay of 100 to 1000 milliseconds, two lines of a different color are printed adjacent to each side of the first line. The print is then examined carefully to detect bleeding of one color into the other.

INDUSTRIAL APPLICABILITY

The inks of the present invention can be used wherever aqueous inks are employed and there is a need for a bleed resistant print. They are, however, specifically designed to operate in a color thermal ink-jet device, analogous to the DESKJET ™ (DESKJET is a trademark of Hewlett-Packard Company), which is a monochrome device.

EXAMPLES

EXAMPLE 1

An ink was formulated consisting, by weight, of
2.3% Food Black 2 (FB2),
6.5% formamide,
0.3% NUOSEPT 95, and
the balance water.

Example 2

A second ink was made as in Example 1, except that 3.0% Direct Blue 199 was substituted for FB2.

Example 3

A third ink was made as in Example 1, except that 1.0% Direct Yellow 86 was substituted for FB2.

Example 4

A fourth ink was made as in Example 1, except that 3.0% Acid Red 27 was substituted for FB2.

Example 5

Bleed tests were run with the yellow ink of Example 3 and black inks as in Example 1 but with varying amounts of formamide. First, a line of black, about 1/32" wide, was printed. After a specific time delay of between 100 and 1000 msec, lines that were parallel to and abutting the black line were printed; these lines were about 1/16" in width.

The bleed rating of black ink into the yellow was evaluated by several individuals by comparison with a set of in-house standards ranging from 1 to 10 the higher the number, the worse the bleed. Their ratings were averaged to come up with a value for a given ink. A difference of 1 unit is easily discernible to a trained observer and is significant. The acceptable threshold was 2.5, and the marginal rating threshold was 4.

As illustrated in FIG. 1, tests carried out at either 4 kHz (240 msec delay) or 6 kHz (120 msec delay) as represented by crosses 2 and stars 1, respectively, were unacceptable, regardless of the formamide concentration. The lines associated with the data points represent a best fit of the observed data. Tests carried out at 2 kHz (360 msec delay) as represented by blocks 3a, b, and c were acceptable at formamide concentrations up to 15%, marginal at 20 to 25%, cf. blocks 3d and e, and unacceptable at 30%, block 3f. Interpolation at 10% formamide would place the upper printing frequency at 3.7 kHz, for marginal acceptability.

What is claimed is:

1. An ink-jet ink suitable for ink-jet printing on plain paper, comprising, by weight:
   (a) from about 4% to less than about 15% formamide,
   (b) from about 1% to about 10% dye, and
   (c) the balance water.

2. An ink of claim 1 which has been buffered at a pH of about 4 to about 10.

3. An ink of claim 1 which has been buffered at a pH of about 6 to about 7.

4. An ink of claim 1 which contains a biocide.

5. An ink of claim 1 wherein the formamide is present in a range from about 5% to about 8%.

6. An ink of claim 2 wherein the dye is present in a range from about 1% to about 4%.

7. A method of printing adjacent colors by ink-jet which comprises printing a printing a pattern on plain paper, allowing the pattern to dry, and printing at a rate up to about 3.7 kHz an adjacent pattern with a different color ink, the inks comprising, by weight,
   (a) from about 4% to less than about 15% formamide,
   (b) from about 1% to about 10% dye, and
   (c) the balance water.

8. A method of claim 7 wherein the rate of printing is about 2 kHz.

9. An ink of claim 1 wherein the formamide is present in a range from about 4% to about 10%.

10. A method of claim 8 wherein the formamide is present in a range from about 4% to about 10%.

* * * * *